(12) United States Patent
Handlogten et al.

(10) Patent No.: US 8,490,102 B2
(45) Date of Patent: Jul. 16, 2013

(54) RESOURCE ALLOCATION MANAGEMENT USING IOC TOKEN REQUESTOR LOGIC

(75) Inventors: Glen H. Handlogten, Rochester, MN (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2391 days.

(21) Appl. No.: 10/901,547

(22) Filed: Jul. 29, 2004

(65) Prior Publication Data

US 2006/0026598 A1    Feb. 2, 2006

(51) Int. Cl.
*G06F 9/46* (2006.01)

(52) U.S. Cl.
USPC .......................................... 718/104

(58) Field of Classification Search
USPC ............................. 711/164; 718/100; 710/240
See application file for complete search history.

(56) References Cited

U.S. PATENT DOCUMENTS

| | | | |
|---|---|---|---|
| 4,574,350 A | 3/1986 | Starr | |
| 5,428,796 A | 6/1995 | Iskiyan et al. | |
| 5,542,076 A | 7/1996 | Benson et al. | |
| 5,708,814 A | 1/1998 | Short et al. | |
| 5,761,734 A * | 6/1998 | Pfeffer et al. | 711/164 |
| 6,324,616 B2 | 11/2001 | Chrysos et al. | |
| 6,651,125 B2 | 11/2003 | Maergner et al. | |
| 6,662,278 B1 | 12/2003 | Kahn et al. | |
| 6,772,352 B1 | 8/2004 | Williams et al. | |
| 6,842,428 B2 * | 1/2005 | Chen et al. | 370/252 |
| 6,965,965 B2 | 11/2005 | Espeseth et al. | |
| 6,978,330 B1 * | 12/2005 | Joffe et al. | 710/240 |
| 6,996,647 B2 * | 2/2006 | Raghavan et al. | 710/240 |
| 7,032,049 B2 | 4/2006 | Barrenscheen | |
| 7,032,222 B1 * | 4/2006 | Karp et al. | 718/104 |
| 7,054,968 B2 | 5/2006 | Shrader et al. | |
| 7,120,717 B2 | 10/2006 | Vu | |
| 7,561,734 B1 | 7/2009 | Wnek | |
| 2006/0037020 A1 | 2/2006 | Accapadi et al. | |

* cited by examiner

*Primary Examiner* — Meng An
*Assistant Examiner* — Eric C Wai
(74) *Attorney, Agent, or Firm* — Dugan & Dugan PC (57) ABSTRACT

In a first aspect, a first method is provided for managing system resource allocation. The first method includes the steps of (1) receiving a first command that requires a system resource; (2) receiving a first request for the system resource for the first command; (3) receiving a second command that requires the system resource; (4) assigning the system resource to the second command; and (5) receiving a second request for the system resource for the second command. Numerous other aspects are provided.

28 Claims, 4 Drawing Sheets

FIG. 1

| Activity Count | Memory Tokens Requests | Missing Memory Tokens | Memory Bank | | IOIF Tokens Requests | Missing IOIF Tokens | IOIF Type | RAID |
|---|---|---|---|---|---|---|---|---|
| | | | IOIF Type | — | | | | |
| Bits 0  1  2  3  4  5  6  7 | 8  9 | 10  11 | 12  13 | 14  15 | 16  17 | 18  19 | 20  21 | 22  23 |

RESOURCE ALLOCATION MANAGEMENT USING IOC TOKEN REQUESTOR LOGIC

FIELD OF THE INVENTION

The present invention relates generally to computer systems, and more particularly to methods and apparatus for resource allocation management within the computer systems.

CROSS REFERENCE TO RELATED APPLICATION

The present application is related to U.S. patent application Ser. No. 10/901,597, filed Jul. 29, 2004 and titled "METHODS AND APPARATUS FOR AGING A COMMAND," which is hereby incorporated by reference herein in its entirety.

BACKGROUND

A computer system (e.g., a computer system made up of multiple processing units) may receive commands which require resources of the computer system. In many conventional computer systems, system resources may be allocated to commands on a first-come first-served basis. However, such an allocation scheme may not efficiently manage the system resources. Accordingly, improved methods and apparatus are desired for managing system resource allocation.

SUMMARY OF THE INVENTION

In a first aspect of the invention, a first method is provided for managing system resource allocation. The first method includes the steps of (1) receiving a first command that requires a system resource; (2) receiving a first request for the system resource for the first command; (3) receiving a second command that requires the system resource; (4) assigning the system resource to the second command; and (5) receiving a second request for the system resource for the second command.

In a second aspect of the invention, a second method is provided for managing system resource allocation. The second method includes the steps of (1) receiving a first command that requires a first system resource, wherein the first command is of a first priority; (2) receiving a first request for the first system resource for the first command; (3) receiving a second command that requires the first system resource, wherein the second command is of the first priority; (4) assigning the first system resource to the second command based on the first priority; and (5) receiving a second request for the first system resource for the second command.

In a third aspect of the invention, a third method is provided for managing system resource allocation. The third method includes the steps of (1) receiving a first command that requires a first one of a plurality of low-demand system resources and a second system resource, wherein the demand for the second system resource is high; (2) assigning the first one of the plurality of low-demand system resources to the first command; (3) after assigning the first one of the plurality of low-demand system resources to the first command, receiving a request for the second system resource for the first command; (4) receiving a second command that requires a second one of the plurality of low-demand system resources and the second system resource; (5) assigning the second one of the plurality of low-demand system resources to the second command; (6) after assigning the second one of the plurality of low-demand system resources to the second command, assigning the second system resource to the second command; and (7) receiving a second request for the second system resource for the second command.

In a fourth aspect of the invention, a fourth method is provided for managing system resource allocation. The fourth method includes the steps of (1) receiving a command that requires a system resource; (2) receiving a request for a token corresponding to the system resource for the command; and (3) assigning the token to the command, thereby assigning the system resource to the command. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

The present invention relates to methods and apparatus for efficiently managing allocation of a system's resources. More specifically, the present methods and apparatus employ tokens, which correspond to the various resources on the system, and efficiently manage requests (e.g., from multiple requesters) for and/or assignment of the tokens to commands. System resources include memory bandwidth to memory banks and bus bandwidth. In this manner, the present methods and apparatus control access to and/or allocate the system resources to commands executed by the system. The present methods and apparatus require less space on a chip than previous methods and apparatus for managing allocation of system resources. Further, the present methods and apparatus enable system resources to be granted to commands more efficiently and enable commands to be released (e.g., after being allocated a system resource) by the system more periodically.

Figure 1:
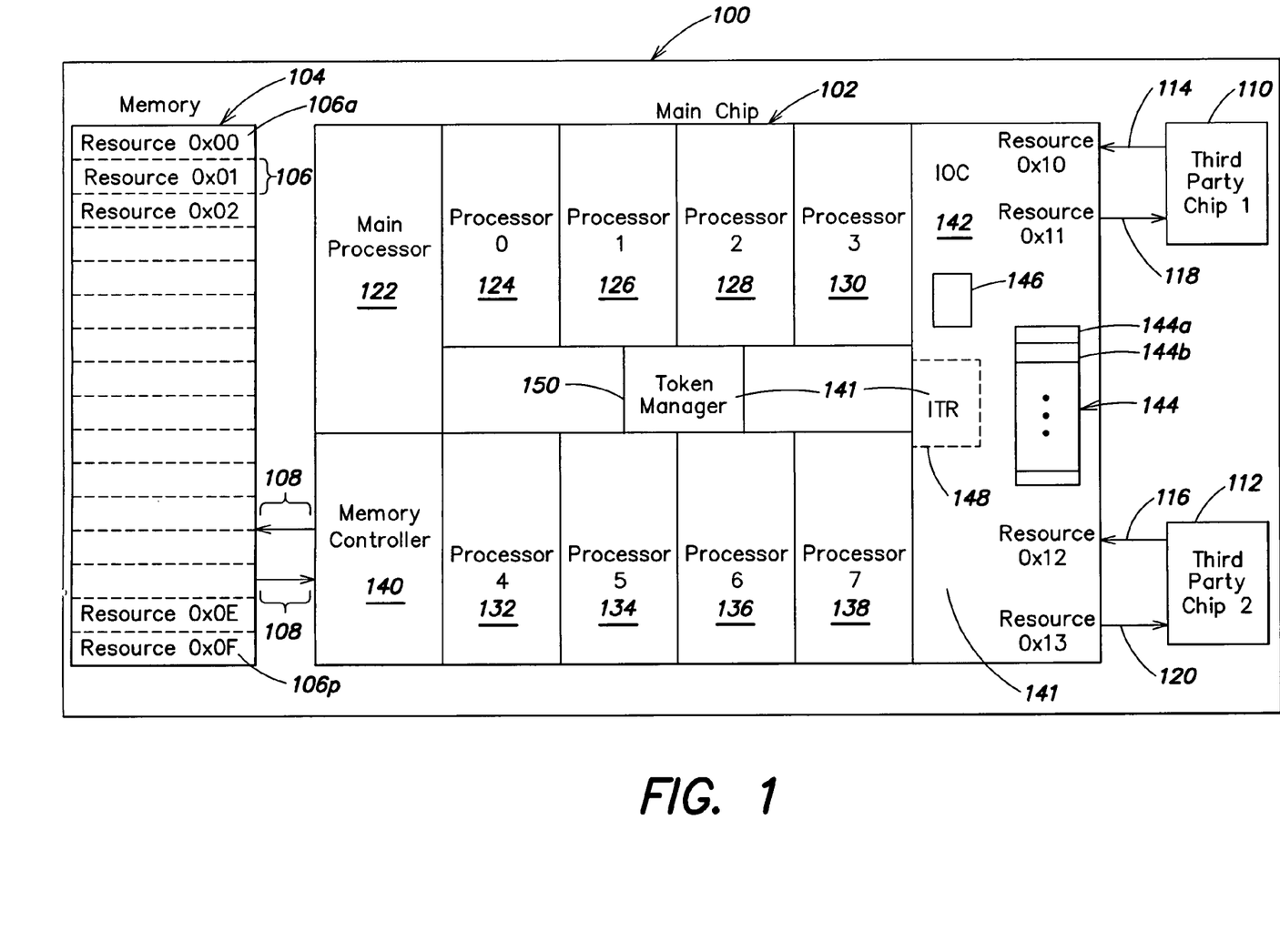
FIG. 1 is a block diagram of an apparatus for managing system resource allocation in accordance with an embodiment of the present invention.

FIG. 1 is a block diagram of an apparatus 100 for managing system resource allocation in accordance with an embodiment of the present invention. The apparatus 100 is a computer system that includes a main chip 102, which is described below, coupled to a memory 104, such as a system memory. The memory 104 may be divided into a plurality of sections (e.g., memory banks 106a-p). In one embodiment, the memory 104 is divided into sixteen memory banks 106a-p. The memory 104 may be divided into a larger or smaller number of memory banks 106a-p. Each of the memory banks 106a-p serves as a system resource. The main chip 102 is coupled to the memory 104 via a memory bus 108, which provides a bandwidth (e.g., memory bus bandwidth) that may be used to access the memory banks 106a-p, for example, in response to a command received by the computer system.

The main chip 102 is coupled to one or more chips (e.g., third party chips 110-112), which may issue commands for the main chip 102. In one embodiment, two third party chips 110-112 are coupled to the main chip 102. Other numbers of third party chips 110-112 may be coupled to main chip 102. The main chip 102 is coupled to the third party chips 110-112 via I/O interfaces (IOIFs), such as respective inbound 114-116 and outbound buses 118-120 (e.g., I/O buses). The respective inbound 114-116 and outbound buses 118-120 coupled to the third party chips 110-112 serve as system resources. Each of the inbound 114-116 and outbound buses 118-120 provides a bandwidth (e.g., I/O bus bandwidth) that may be used for communication between one of the third party chips 110-112 and other components coupled to the main chip 102. Therefore, the apparatus 100 includes system resources, such as memory banks 106a-p and I/O interfaces.

The main chip 102 includes a plurality of processors, such as a main processor 122 and eight co-processors 124-138. The main chip 102 may include a larger or smaller number of main processors 122 and/or co-processors 124-138. Components of the main chip 102, such as the processors 122-138, may require, and therefore, request access to one or more system resources. The main chip 102 includes a memory controller 140 that serves as an interface to the memory 104. Alternatively, the main chip 102 may not include a memory controller 140.

Further, the main chip 102 includes and/or is coupled to a plurality of logic 141 adapted to manage allocation of the system resources. More specifically, the plurality of logic 141 implements Resource Allocation Management (RAM) that provides an access control mechanism for allocating one or more portions of a system resource to one or more components which request the system resource. The plurality of logic 141 may associate a token with each system resource. RAM may require a command residing in a component of the computer system, such as one of the main chip processors 122-138 or the third party processors 110-112, which requires a system resource, to request and acquire (e.g., be granted) a token corresponding to the system resource before using the system resource. In a first set of embodiments of the present invention, a token requested for a first command residing in a component 110-112, 122-138 of the computer system 100 may not be requested for a second command residing in the component 110-112, 122-138 until the token is granted to the first command residing in the component 110-112, 122-138.

As described below, a second set of embodiments of the present invention may not require a token requested for a first command residing in the component 110-112, 122-138 to be granted to the requesting command before a second command residing in the component 110-112, 122-138 may request the token. In such embodiments, the token requested for the first command residing in the component 110-112, 122-138 may be granted to (e.g., borrowed by) the second command residing in the component 110-112, 122-138. Therefore, in the second set of embodiments, when a token is granted to a component 110-112, 122-138, the token may be assigned to any command, which requires the token, residing in the component 110-112, 122-138. More specifically, the token does not have to be assigned to the command for which the request was originally made. Thereafter, another command residing in the component 110-112, 122-138 of the computer system may request the token.

In either set of embodiments, a token requested by a component 110-112, 122-138 may not be requested again by the component 110-112, 122-138 until the token has been granted to that component 110-112, 122-138. Components 110-112, 122-138 may not have and may not need any knowledge of token requests made by other components 110-112, 122-138 of the computer system. Therefore, there may be multiple requests for a particular token, but only one per component 110-112, 122-138. Further, each component 110-112, 122-138 is allowed a single outstanding request per token type (e.g., per each token corresponding to a system resource).

As will be described below, commands, which require tokens, originating from third party chips 110-112 may be combined in a single component that requests the required tokens. Therefore, in the second set of embodiments, requests for such commands may be deemed as for a single component, and tokens granted to the single component may be assigned to any command from any (e.g., either) third party chip 110-112.

The plurality of logic 141 includes an input/output controller (IOC) 142 coupled to the inbound 114-116 and outbound buses 118-120. The IOC 142 includes an array 144, which includes a plurality of entries, and a plurality of registers 146 or similar devices, each of which is adapted to store an index corresponding to an array entry. In one embodiment, the IOC 142 serves as a proxy for one or more components coupled to the main chip (e.g., third party chips 110-112). More specifically, the IOC 142 receives commands from a third party chip 110-112 and includes the third party chip command in the main chip 102. In this manner, commands from components (e.g., commands from third party chips 110-112) are combined in the IOC 142 and resources are requested for such commands by the IOC 142. The IOC 142 is adapted to manage the indexes stored in the plurality of registers 146 and associate an unused index with a command received by the IOC 142 from a component 110-112, 122-138. The received command is stored in the array entry indicated by the index with which the command is associated. In one embodiment, the array 144 includes sixty-four entries. Therefore, the IOC 142 may receive and store up to sixty-four commands (e.g., up to sixty-four commands are "in flight"). The array 144 may include more or less entries, and therefore, the IOC 142 may receive and store more or less commands. Each of the commands may require up to three system resources (e.g., tokens corresponding to system resources). The structure of an array entry is described below with reference to FIG. 2.

In one or more embodiments, components 110-112, 122-138 of the apparatus 100, and therefore, commands from the components 110-112, 122-138, are grouped together to form one or more Resource Allocation Groups (RAGs), each of which is assigned a Resource Allocation ID (RAID). The plurality of logic 141 may allocate system resources to commands received from components 110-112, 122-138 in a RAG based on the RAID assigned to the RAG. More specifically, processes with one RAID may be allocated system resources more frequently than processes with other RAIDs. In this manner, the RAID associated with each RAG serves as a priority for the RAG.

The plurality of logic 141 includes IOC Token Requester logic (ITR) 148 coupled to the main chip 102. The IOC 142 may include the ITR 148. The ITR 148 is adapted to efficiently request tokens required by a command received by the IOC 142. A request to obtain a token for a command is passed in the form of an index, which is used to obtain information about the command stored in the array 144. The ITR 148 receives an index and makes a read request to the array 144. In this manner, the ITR 148 may free indexes corresponding to commands. An index associated with a command is freed (e.g., available) once all tokens required by the command are granted to the command and all required token requests are made for the command. The index may not be associated with another command until the index is freed. Further, the ITR 148 is adapted to receive a granted token and efficiently assign the granted token to a command which requires the token. In this manner, the ITR 148 may free commands. A command is freed from (e.g., may exit) the IOC 142 (e.g., ITR 148) once all tokens required by the command are assigned. The ITR 148 updates the array entry corresponding to a command, for example, after requesting a token for the command or assigning a token to the command.

The plurality of logic 141 includes Token Manager logic (TM) 150 coupled to the IOC 142. The TM 150 is adapted to generate a token corresponding to one or more system resources. A user may configure the TM 150 to generate a token corresponding to a system resource based on a specified period for the resource. For example, the TM 150 may initially create the token corresponding to the system resource in a time based on the specified period. Therefore, the order in which the requested token is granted to may not be predictable (e.g., by a requester). Once the token is granted, the TM 150 may create a new token for the system resource based on the specified period. Further, the TM 150 is adapted to receive a request for a token, which corresponds to a system resource, from the ITR 148. In one embodiment, the apparatus 100 includes twenty system resources (e.g., the sixteen memory banks 106a-p and two inbound 114-116 and two outbound I/O buses 118-120). Therefore, the TM 150 creates twenty tokens for each RAG. In other embodiments, the apparatus 100 may include more or less system resources and, therefore, the TM 150 may create more or less tokens.

Figure 2:
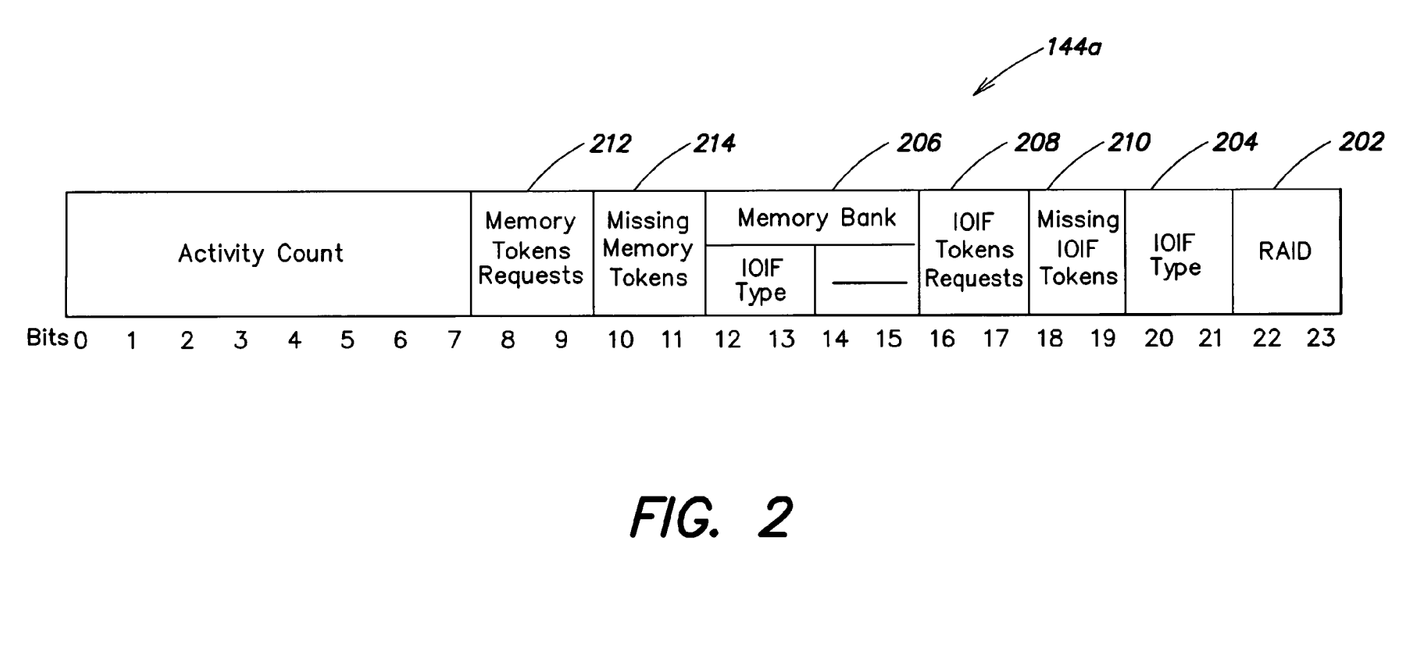
FIG. 2 is a block diagram of an array entry in accordance with an embodiment of the present invention.

FIG. 2 is a block diagram of an array entry (e.g., 144a) in accordance with an embodiment of the present invention. Each array entry 144a corresponds to a command received by the IOC 142 (e.g., ITR 148), and includes information about the command. In one embodiment, the array entry 144a is twenty-four bits wide. The array entry 144a may be larger or smaller. The array entry 144a includes a RAID field 202 for storing bits which indicate a RAID associated with the command. In one embodiment, the RAID field may be two-bits wide. However, the RAID field may be different sizes.

The array entry 144a includes an IOIF Type field 204, which indicates the type of a first I/O bus token (IOIF token) required by the command. For example, in the apparatus 100 of FIG. 1, a command may require a token corresponding to the inbound bus 114 coupled to a first third party processor 110, outbound bus 118 coupled to the first third processor 110, inbound bus 116 coupled to a second third party processor 112 or outbound bus 120 coupled to the second third party processor 112. In one embodiment, the IOIF type field 204 may be two-bits wide. The IOIF type field 204 may be a different size.

The array entry 144a includes a memory bank/IOIF Type field 206. If the command requires a token for a memory bank 106a-p (e.g., a memory token), the memory bank/IOIF Type field 206 indicates which memory token is required. However, if the command does not require a memory token but requires a second IOIF token, a portion of the Memory Bank/IOIF Type field 206 indicates which type of IOIF token is required for the second IOIF token. In one embodiment, the Memory Bank/IOIF Type field 206 is four-bits wide. Four bits of the Memory Bank/IOIF Type field 206 may be used for indicating a required memory token and two bits of the Memory Bank/IOIF type field 206 may be used for indicating the second required IOIF token. The Memory Bank/IOIF type field 206 may be different sizes.

The array entry 144a includes an IOIF Token Requests field 208 which indicates IOIF token requests that must be made. For example, the IOIF Token Requests field 208 may be two-bits wide, and each bit indicates an IOIF token request that must be made. However, the IOIF Token Requests field 208 may be of a different size. Further, the array entry 144a includes a "Missing IOIF Tokens" field 210 which indicates IOIF tokens that must be obtained. In one embodiment, the "Missing IOIF Tokens" field 210 may be two-bits wide, and each bit indicates an IOIF token that must be obtained. However, the "Missing IOIF Tokens" field 210 may be different sizes. The array entry 144a includes a Memory Tokens Requests field 212 which indicates memory token requests that are to be made. For example, the Memory Tokens Requests field 212 may be two-bits wide, and each bit indicates a memory token request to be made. However, the Memory Tokens Requests field 212 may be different sizes. Further, the array entry 144a may include a "Missing Memory Tokens" field 214 which indicates memory tokens that must be obtained for the command. In one embodiment, the "Missing Memory Tokens" field 214 may be two-bits wide, and each bit may indicate a memory token to be obtained. However, the "Missing Memory Tokens" field 214 may be different sizes.

Figure 3:
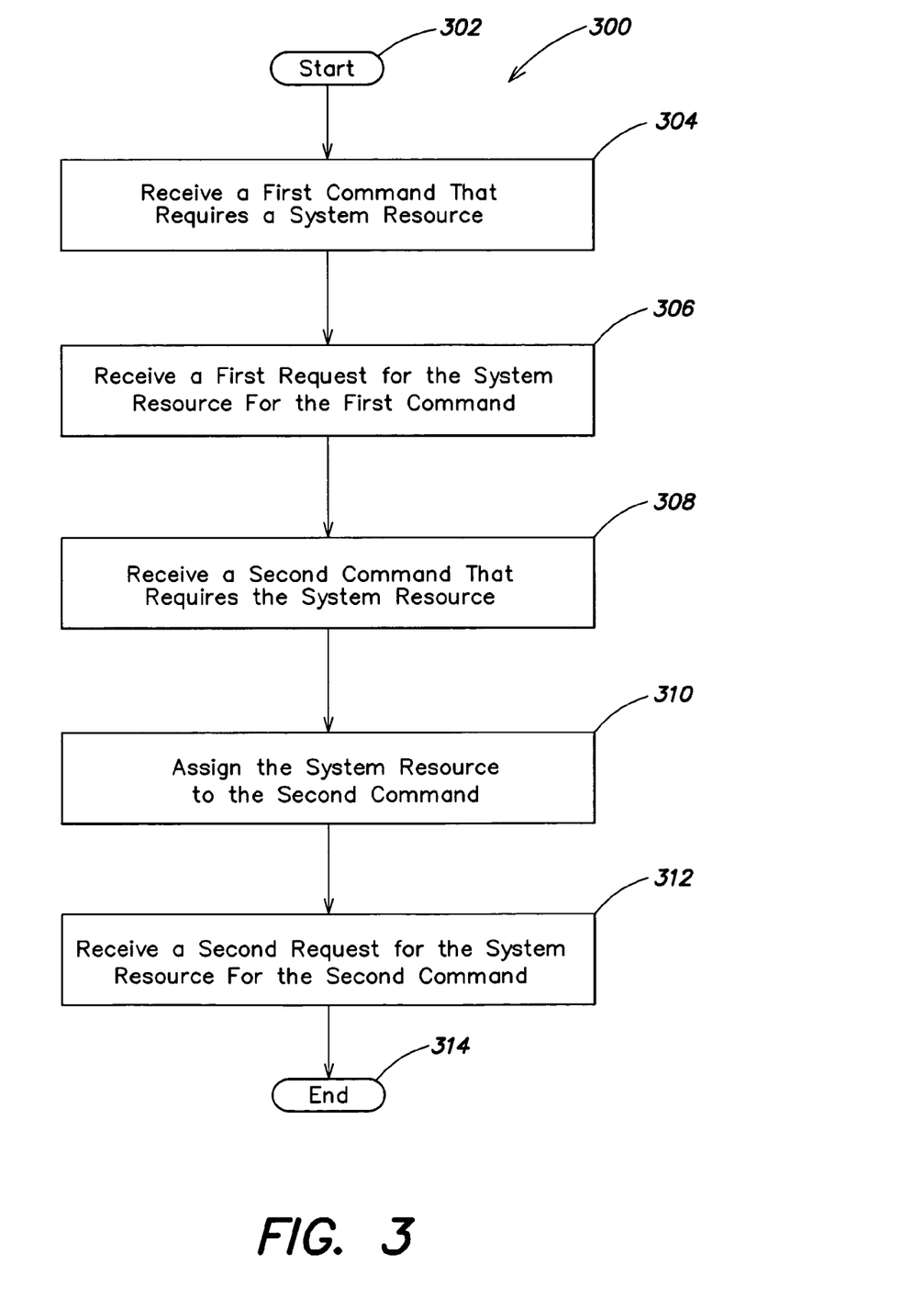
FIG. 3 illustrates a first exemplary method for managing system resource allocation in accordance with an embodiment of the present invention.

The operation of the apparatus 100 for managing system resource allocation is now described with reference to FIGS. 1 and 2, and with reference to FIG. 3, which illustrates a first exemplary method for managing system resource allocation in accordance with an embodiment of the present invention. More specifically, FIG. 3 illustrates a method for managing system resource allocation that allows a system resource, which is requested for a first command, to be granted to (e.g., borrowed by) a second command. With reference to FIG. 3, in step 302, the method 300 begins. In step 304, a first command that requires a system resource is received. More specifically, the IOC 142 may receive the first command from one of the components of the apparatus 100, such as a third party processor 110-112. As stated, when the IOC 142 receives the first command, the IOC 142 associates the first command with an available index from a pool of indexes. The index corresponds to an entry 144a in an array 144. The fields of the array entry are populated with information from the first command. For example, if the first command requires access to memory bank 106a and the outbound bus 118 coupled to the first third party processor 110, bits in the Memory Bank/IOIF Type 206, IOIF Token Requests 208, "Missing IOIF Tokens" 210, Memory Tokens Requests 212, and "Missing Memory Tokens" fields 214, among others, may be set (e.g., asserted). More specifically, bits in the Memory Bank/IOIF Type field 206 are asserted to indicate the first command requires a memory token for memory bank 1. Further, one or more bits in the IOIF Token Requests field 208 are set to indicate that a request for the required IOIF token (e.g., the token corresponding to the outbound bus 118 coupled to the first third party processor 110) has not been made. Similarly, bits in the "Missing IOIF Tokens" field 210 are set to indicate that one or more required IOIF tokens have not been acquired. Further, one or more bits in the Memory Token Requests field 212 are set to indicate a request for the required memory token (e.g., the token corresponding to memory bank 1) has not been made. Similarly, one or more bits in the "Missing Memory Tokens" field 214 are set to indicate that one or more required memory tokens have not been acquired. The command may include bits in a RAID field 202 indicating the RAG to which the component 110-112, which issued the command, belongs. In this manner, the IOC 142 may receive and store a plurality of commands in an array 144 of the main chip 102. The array 144 serves as a wait queue for the command.

The ITR 148 scans the array entries to determine commands for which a request for a system resource (e.g., a token corresponding to the system resource) is required. More specifically, during a first time period (e.g., a first processor cycle), the ITR 148 may access a first array entry 144a to determine whether the command corresponding to the first array entry 144a requires a token request. During a next time period (e.g., a second processor cycle), the ITR 148 may access a second array entry 144b to determine whether the command corresponding to the second array entry 144b requires a token request. Similarly, the ITR 148 scans the remaining array entries during subsequent time periods. If the ITR 148 accesses the last array entry during a time period, during the next time period, the ITR 148 accesses the first array entry 144a. Once the ITR 148 determines a command requires a request for a system resource (e.g., a token corresponding to the system resource), the ITR 148 determines whether a previous request by a command for that same system resource is pending. The ITR 148 includes logic adapted to determine whether a previous request for each system resource is pending. If the ITR 148 determines a previous request for the system is not pending, the ITR 148 requests the required system resource. More specifically, the ITR 148 issues a request (e.g., first request) to the TM 150 for the required system resource. The ITR 148 may request the system resource required by the command during the same time period the ITR 148 accessed the array entry corresponding to the command. Alternatively, the ITR 148 may request the required system resource during another time period.

In step 306, a first request for the system resource is received for the first command (e.g., the first request for the system resource may be received from the first command or on behalf of the first command). For example, the ITR 148 makes a first request for the system resource needed by the first command. The TM 150 receives the request for the system resource (e.g., for a token corresponding to the system resource) on behalf of the first command from the ITR 148. The TM 150 may provide (e.g., grant) the requested token to the ITR 148. As described above, the TM 150 is configured to generate a token based on a user-specified period. Therefore, the TM 150 may have generated the required token before the request from the ITR 148 is received. Consequently, the TM 150 may grant the required token shortly (e.g., within a few time periods) after the token request is received. Alternatively, if the requested token is not already generated, the TM 150 generates the token at a time based on the TM 150 configuration. Multiple time periods may elapse while the TM 150 generates the requested token. Once the TM 150 grants the requested token to the ITR 148, the request for the token is no longer pending.

In step 308, a second command that requires the system resource is received. Therefore, the first and second commands require the same system resource. Similar to step 304, the IOC 142 may receive the second command from one of the components (e.g., third party chips 110-112) of the apparatus, associate the second command with an index corresponding to an entry (e.g., 144b) in the array 144 and populate the fields of the entry 144b with information from the second command. For example, the second command may be received one or more time periods after the first command is received.

After accessing the array entry 144a corresponding to the first command, the ITR 148 may access the array entry 144b corresponding to the second command to determine the status of the second command. More specifically, the ITR 148 may determine whether the second command requires a token(s), needs to request the required token(s) and/or has obtained the required token(s). For example, the ITR 148 may access the array entry 144b corresponding to the second command during a time period after the TM 150 grants the system resource (e.g., the token corresponding to the system resource) requested by the ITR 148 on behalf of the first command to the ITR 148. As stated, at this time the request for the system resource (e.g., the token corresponding to the system resource) is no longer pending. During this time period, the ITR 148 determines the second command requires the system resource (e.g., the same system resource required by the first command), needs to request the system resource and needs to obtain the system resource.

In step 310, the system resource is assigned to the second command. More specifically, the ITR 148 assigns the system resource (e.g., the token corresponding to the system resource) requested for the first command to the second command. The second command may be assigned the system resource before the ITR 148 requests the system resource on behalf of the second command. By assigning the system resource requested for another command (e.g., the first command) to the second command, the second command borrows the system resource from the first command. Allowing a command to borrow system resources from other commands (e.g., system resource borrowing) improves system performance. For example, rather than granting the system resource to the requester of the system resource (e.g., the first command), which requires waiting (e.g., up to sixty-four time periods) until the ITR 148 accesses the array entry 144a corresponding to the first command again, the system resource may be assigned to the second command, thereby freeing the second command (assuming the second command does not require other system resources). Therefore, the system resource is allocated to a command sooner, which frees commands more efficiently (e.g., sooner). Further, system resource borrowing eliminates the need to correlate a granted system resource to a command that requested the system resource, which may simplify the design of the plurality of logic 141. Consequently, less space is required on the main chip 102.

In step 312, a second request for the system resource is received for the second command (e.g., the second request for the system resource may be received from the second command or on behalf of the second command). For example, the ITR 148 makes a second request for the system resource needed by the second command. The TM 150 receives a request for the system resource (e.g., for a token corresponding to the system resource) on behalf of the second command from the ITR 148. The second request for the system resource for the second command may be received after the system resource is granted to the second command. In this manner, the TM 150 may generate the system resource (e.g., a token corresponding to the system resource) for another command (e.g., the first command). Further, because the system resource is already allocated to the second command, the index associated with the second command is freed once the ITR 148 requests the system resource. Thereafter, step 314 is performed. In step 314, the method 300 ends.

Additionally, in one or more embodiments, the system resource is granted to the first command. For example, the TM 150 generates and grants the system resource requested on behalf of the second command to the ITR 148, and while accessing the array entry 144a corresponding to the first command, the ITR 148 assigns the system resource to the first command. In this manner, the index associated with the first command and/or the first command may be freed.

Through the use of the method 300 of FIG. 3, a granted system resource may be assigned to a second command before the system resource is assigned to a first command, for which the system resource was requested. Further, a request for the system resource for the second command is not required before being assigned the system resource. In this manner, commands may be freed at a steady pace and apparatus performance is thereby improved.

In one or more embodiments, commands received by the IOC 142 may be from components (e.g., third party chips 110-112) included in different RAGs, and therefore, of different RAIDs (e.g., priorities). In such embodiments, more than one token corresponds to a system resource (e.g., a memory bank 106*a-p* or I/O bus 114-120) of the apparatus 100. For example, a token for each RAID corresponds to a system resource. For an apparatus 100 that employs twenty token types and four RAGs, eighty different tokens are employed. Further, a command received by the IOC 142 includes a RAID, the ITR 148 will request a system resource by requesting the token corresponding to the system resource for the RAID, and the TM 150 generates the requested token based on TM 150 configuration. For example, the TM 150 may be configured to generate a token corresponding to a system resource for a first RAID at a pace faster than a token corresponding to the system resource for a second RAID, thereby assigning priorities corresponding to RAIDs to the commands and generating tokens based on the priorities. A method similar to the method 300 of FIG. 3 may be employed to receive commands of more than one priority and allocate system resources to the commands, while allowing commands, which require the same token (e.g., a token corresponding to the system resource for a RAID), to borrow the token from each other.

Figure 4:
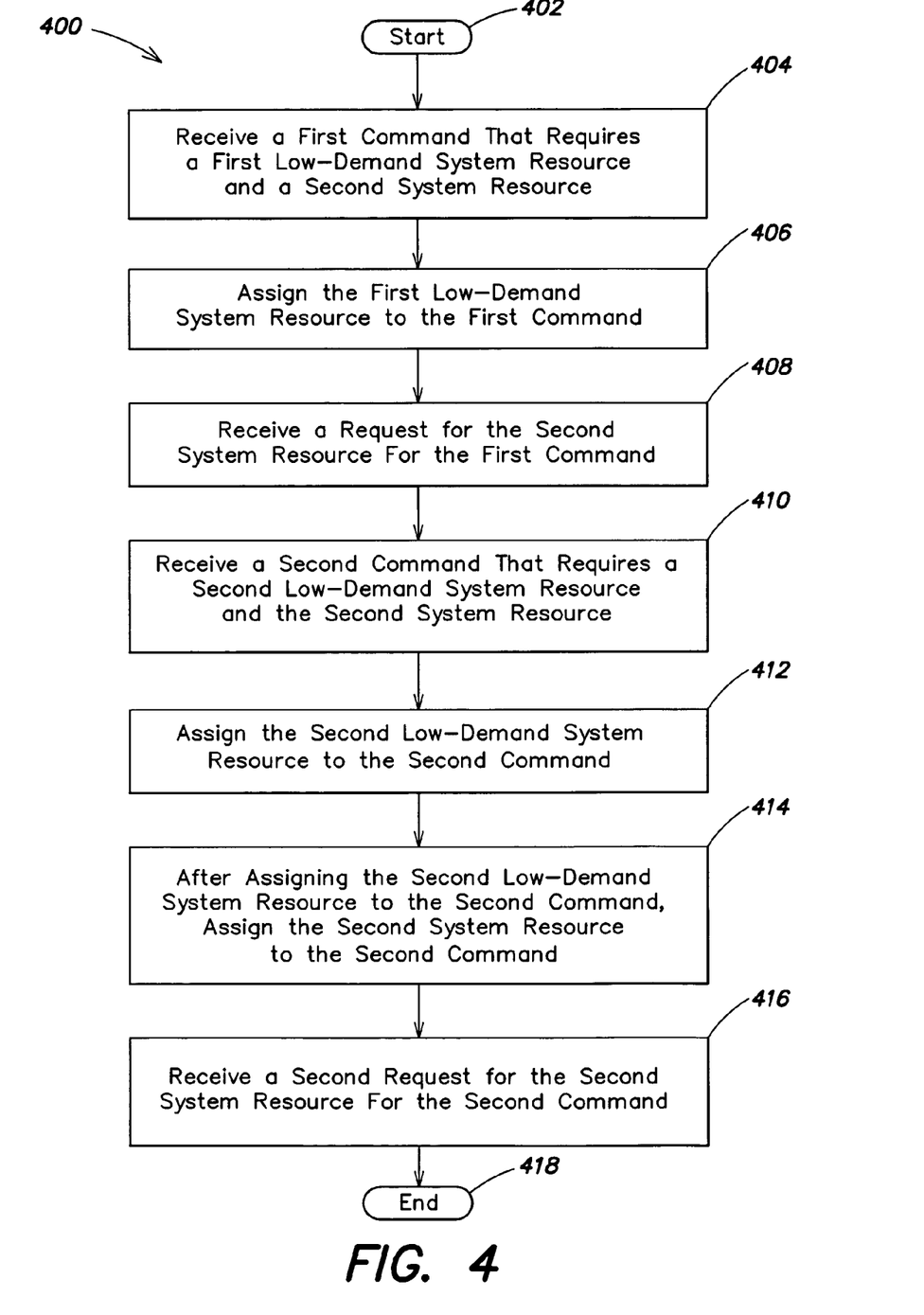
FIG. 4 illustrates a second exemplary method for managing system resource allocation in accordance with an embodiment of the present invention.

The operation of the apparatus 100 for managing system resource allocation is now described with reference to FIGS. 1 and 2, and with reference to FIG. 4, which illustrates a second exemplary method for managing system resource allocation in accordance with an embodiment of the present invention. More specifically, FIG. 4 illustrates a method for managing system resource allocation among commands, which require one or more system resources. With reference to FIG. 4, in step 402, the method 400 begins. In step 404, a first command that requires a first one of a plurality of low-demand system resources and a second system resource is received. The demand for the second system resource is high (e.g., higher than the low-demand system resources). For example, in a manner similar to step 304, described above, the IOC 142 receives the first command from a component (e.g., a third party chip 110-112) of the apparatus 100.

The ITR 148 requests the first one of the low-demand (e.g., low-demand/low-availability) system resources (e.g., a token corresponding to the first one of the low-demand system resources), such as a memory bank 106*a-p*, from the TM 150. The request includes a RAID associated with the command. The TM 150 receives the request for the first one of the low-demand system resources and generates the requested token (if not previously generated). The TM 150 is configured to generate tokens based on the token requested and the RAID associated with the requested token. Thereafter, the TM 150 grants the generated token to the ITR 148

In step 406, the first one of the plurality of low-demand system resources is assigned to the first command. More specifically, the ITR 148 assigns the first one of the plurality of low-demand system resources (e.g., a token corresponding to the first one of the plurality of low-demand system resources, such as a memory bank 106*a-p*) to the first command. Thereafter, the ITR 148 requests the second system resource (e.g., a token corresponding to the high-demand (e.g., high-demand/high-availability) system resource, such as I/O bus 114-120 bandwidth). The ITR 148 does not request the high-demand system resource for the first command until the low-demand system resource required by the first command is obtained.

In step 408, after assigning the first one of the plurality of low-demand system resources to the first command, a request for the second system resource is received for the first command (e.g., the request for the second system resource may be received from the first command or on behalf of the first command). More specifically, the ITR 148 may access, in the manner described above, an array entry 144*a* corresponding to the command which requires the first one of a plurality of low-demand system resources and a second system resource. If the ITR 148 determines the low-demand system resource is obtained, the ITR 148 requests the second system resource from the TM 150 on behalf of the first command. The TM 150 receives the request for the second system resource on behalf of the first command from the ITR 148. As described above, the TM 150 may require a plurality of time periods to generate the required system resource. During this time, the ITR 148 continues to access array entries corresponding to commands to determine whether a token request is required on behalf of the commands or whether a granted token may be assigned to the command. For example, the ITR 148 may access a different array entry every time period. Therefore, for an array 144 which stores sixty-four commands, the ITR 148 accesses array entry 144*a* once every sixty-four time periods. However, the ITR 148 may access the array entries at a different rate.

In step 410, a second command that requires a second one of the plurality of low-demand system resources and the second system resource is received. In a manner similar to step 304, described above, the IOC 142 receives the second command from a component (e.g., a third party chip 110-112) of the apparatus 100. The second command may require a different low-demand system resource than the first command, and the same high-demand system resource as the first command. An entry 144*b* corresponding to the second command is entered in the array 144.

In the manner described above, the ITR 148 may access the entry corresponding to the second command and request the second one of the plurality of low-demand system resources from the TM 150. More specifically, the ITR 148 requests a token corresponding to the second one of a plurality of low-demand system resources from the TM 150. The TM 150 receives the request from the ITR 148 on behalf of the second command, generates the requested token, and grants the token to the ITR 148. The token may be granted to the ITR 148 during the same time period that the request from the ITR 148 is made or a subsequent time period.

In step 412, the second one of the plurality of low-demand system resources is assigned to the second command. While accessing the array entry 144*b* corresponding to the second command (e.g., during a subsequent time period), the ITR 148 will determine the second command requires, but has not obtained, the second one of the plurality of low-demand system resources. Therefore, the ITR 148 will assign the required system resource to the second command.

In step 414, after assigning the second one of the plurality of low-demand system resources to the second command, the second system resource is assigned to the second command. For example, after receiving the request on behalf of the first command for the second system resource in step 406, the TM 150 generates (if not previously generated) and grants the second system resource to the ITR 148. After the second system resource is granted to the ITR 148, the ITR 148 may access the entry 144*b* corresponding to the second command before accessing the entry 144*a* corresponding to the first command. When accessing the array entry 144*b* corresponding to the second command, the ITR 148 determines the second command requires the second system resource and has not requested the second system resource. Although the second command has not requested the second system resource, the ITR 148 assigns the second system resource to the second command. Therefore, the system resource granted by the TM 150 is not bound to the command which requested the system resource, and the system resource may be assigned to a command which has a more immediate need than the command which requested the system resource.

In step 416, a second request for the second system resource is received for the second command (e.g., the second request for the system resource may be received from the second command or on behalf of the second command). More specifically, the ITR 148 accesses the array entry 144*b* corresponding to the second command, and determines a request for the second system is required and has not been made. Therefore, the second command requests the second system resource. More specifically, the ITR 148 requests the second system resource from the TM 150 on behalf of the second command. The ITR 148 may request the second system resource during the same time period that the second system resource is assigned to the second command. Alternatively, the ITR 148 may request the second system resource during a subsequent time period. Because the second system resource may be assigned to (e.g., obtained by) the second command before the second command requests the second system resource, the request for the second system resource from the TM 150 on behalf of the second command serves as a "replacement" request. The "replacement" request ensures a request is pending for a system resource for every pending need for the system resource. In the present example, the request for the second system resource for the second command, which is received after the second command is assigned the second system resource, serves as a "replacement" request for the first command. Therefore, the TM 150 may receive a request for the second system resource from the ITR 148 on behalf of the second command, generate the second system resource, and grant the second system resource to the ITR 148, before the ITR 148 accesses the array entry 144*a* corresponding to the first command again, thereby making the second system resource available to the first command.

The "replacement" request frees the index corresponding to the second command, thereby allowing the index to be used by another command received by the IOC 142.

In step 418, the method 400 ends. Through the use of the method 400 of FIG. 4, commands are freed more periodically by assigning a high-demand system resource to a command, which requires both a high-demand and a low-demand system resource, after the command obtains the low-demand system resource.

The present methods and apparatus allow a system resource to be assigned to a command which has not requested the system resource. Therefore, the present methods and apparatus may manage requests for the system resource from commands to optimize the rate at which indexes are freed and/or manage assignment of system resources to commands to optimize the rate at which commands are freed.

The foregoing description discloses only exemplary embodiments of the invention. Modifications of the above disclosed apparatus and methods which fall within the scope of the invention will be readily apparent to those of ordinary skill in the art. For instance, although one or more of the above embodiments describe a method of managing system resource allocation in which a system resource is assigned to a command before the command requests the system resource, other embodiments include broader aspects. For example, the present invention includes methods and apparatus for managing system resource allocation by (1) receiving a command which requires a system resource; (2) receiving a request for a token corresponding to the system resource for the command; and (3) assigning the token to the command, thereby assigning the system resource to the command. For example, a request is made by the command or on behalf of the command for the token corresponding to the system resource.

Further, commands described with reference to FIGS. 3 and 4 may be from the same component of the computer system or from one or more different components (e.g., one or more third party chips 110-112) of the computer system.

In one or more embodiments, tokens created by the apparatus 100 include memory tokens, which correspond to the memory banks 106*a*-*p*, IOIF0 tokens which correspond to the inbound 114 and outbound I/O bus 118 coupled to the first third party chip 110, and IOIF1 tokens which correspond to the inbound 116 and outbound I/O bus 120 coupled to the second third party chip 112. The IOIF0 tokens may be generated at a higher rate than other tokens, and may be in high demand. The memory tokens are less "generic" than the IOIF tokens, which results in reduced competition for a specific memory token. In one embodiment, the ITR 148 may have (e.g., access) up to forty-eight commands from one of the third party chips. The commands need one of the IOIF0 tokens and may also need one of the memory tokens.

In one embodiment, the indexes and/or tokens are referred to using hexadecimal format (e.g., index 0x1E), and tokens that may be created by the apparatus 100 may be numbered in sequence (e.g., tokens 1-20). More specifically, tokens corresponding to memory banks 0-15 may be referred to as token 0x0-0xF, respectively. The IOIF0 inbound bus, IOIF0 outbound bus, the IOIF1 inbound bus and the IOIF1 outbound bus may be referred to as 0x10-0x13, respectively.

If tokens are not assigned carefully, problems occur. For example, assume a command in index 0x1E obtains memory token 0xB but still needs an IOIF0 token. Other commands in the array 144 may also need the same IOIF0 token during the same time period. When the IOIF0 token is granted to the ITR 148, the ITR 148 is examining (accessing) index 0x1A, which needs the IOIF0 token and memory token 0x5. The ITR 148 may assign the IOIF0 token to the command corresponding to index 0x1A. However, because index 0x1A has not obtained memory token 0x5, the IOIF0 token is tied up by the command corresponding to index 0x1A that may not be freed for some time. Command index 0x1E still needs and must wait for the IOIF0 token. Because other commands may also need and may be granted the IOIF0 token before command index 0x1E, it may be some time before the ITR 148 is processing or accessing command index 0x1E with an IOIF0 token available for assigning. More specifically, because newly freed indexes are filled with new commands, which may require the same IOIF0 token, the chances of the IOIF0 token being granted to command index 0x1E do not improve over time. As shown above, assigning a token to the wrong command can be costly. When commands tie up tokens, the intended pacing effect of RAM is diminished. Commands are freed later and less periodically than intended.

Further, even allowing the wrong command to request a token causes problems. Once a request for a token is made by a command, another command cannot request that same token. As stated above, an index associated with a command cannot be freed until all requests required by the command are made. However, an index corresponding to a command that needs to be freed may be prevented from making a request, because each time the index is serviced, a previous request for the token from another command is pending. The previous request ties up the index, and therefore reduces the efficiency of the IOC 142.

The present methods and apparatus avoid the above problems by allowing ITR token borrowing (e.g., giving a token to the first eligible command found to require the token). Requests and assignments of high-demand, somewhat generic tokens for a command are only allowed after low-demand (e.g., more specific, lower rate tokens) have been obtained by the command. In one embodiment, by default, IOIF0 tokens are not requested for or assigned to a command until all other tokens required by the command are obtained by the command.

In one or more embodiments, in an apparatus 100 which employs RAGs, RAM ensures system resources are properly shared between the RAGs. A portion of each managed system resource's time is allotted to the RAGs. More specifically, each RAG may claim a portion of a managed system resource's bandwidth. A RAG may request more system resources than allocated to the RAG. However, such a request is only granted if another RAG is not fully using the system resources allocated to the RAG and is configured to share such system resources.

In one or more embodiments, RAGs are groups of one or more hardware units known as requesters, which are physical or virtual units that may initiate load or store requests, or DMA read or write accesses. Requestors such as the main processor and co-processors are in a single RAG. However, the RAG to which these requesters belong may vary over time. Further, the IOC 142 has a virtual channel for each RAG. More specifically, four RAGs may be associated with IOIF0 and four RAGs may be associated with IOIF1. Therefore, the apparatus 100 may include seventeen requesters.

In one embodiment, a command may require two tokens, a bus token (based on the command's opcode) and a memory token (based on a memory address in the command). In one or more embodiments, tokens are only required to access managed system resources; no tokens are required for unmanaged resources.

Accordingly, while the present invention has been disclosed in connection with exemplary embodiments thereof, it should be understood that other embodiments may fall within the spirit and scope of the invention, as defined by the following claims.

The invention claimed is:

1. A processor-executed method for managing system resource allocation, comprising:
   receiving at an input/output controller (IOC) a first command that requires a system resource;
   receiving from an IOC token requestor (ITR) a first request for a token corresponding to the system resource for the first command in response to receiving the first command;
   receiving at the IOC a second command that requires the system resource;
   assigning the token corresponding to the system resource to the second command by the ITR; and
   receiving from the ITR a second request for the token corresponding to the system resource for the second command in response to receiving the second command;
   wherein receiving the second request for the system resource for the second command includes receiving the second request for the system resource for the second command after the system resource is assigned to the second command.

2. The method of claim 1 further comprising assigning the system resource to the first command.

3. The method of claim 1 wherein the system resource includes at least one of memory or bus bandwidth.

4. A processor-executed method for managing system resource allocation, comprising:
   receiving at an input/output controller (IOC) a first command that requires a first system resource, wherein the first command is of a first priority;
   receiving from an IOC token requestor (ITR) a first request for a token corresponding to the first system resource for the first command in response to receiving the first command;
   receiving at the IOC a second command that requires the first system resource, wherein the second command is of the first priority;
   assigning the token corresponding to the first system resource to the second command by the ITR; and
   receiving from the ITR a second request for the token corresponding to the first system resource for the second command in response to receiving the second command,
   wherein receiving the second request for the first system resource for the second command includes receiving the second request for the first system resource for the second command after the first system resource is assigned to the second command.

5. The method of claim 4 further comprising receiving a third command that requires at least one of the first system resource or a second system resource, wherein the third command is of a second priority.

6. The method of claim 5 further comprising:
   receiving a request for the required at least one of the first system resource or the second system resource for the third command; and
   assigning the required system resource to the third command based on the second priority.

7. The method of claim 4 further comprising assigning the first system resource to the first command.

8. The method of claim 4 wherein the first system resource includes at least one of memory or bus bandwidth.

9. A processor-executed method for managing system resource allocation, comprising:
   receiving at an input/output controller (IOC) a first command that requires a first one of a plurality of low-demand system resources and a second system resource, wherein the demand for the second system resource is high;
   assigning the first one of the plurality of low-demand system resources to the first command by an IOC token requestor (ITR);
   after assigning the first one of the plurality of low-demand system resources to the first command, receiving from the ITR a request for a token corresponding to the second system resource for the first command in response to receiving the first command;
   receiving at the IOC a second command that requires a second one of the plurality of low-demand system resources and the second system resource;
   assigning the second one of the plurality of low-demand system resources to the second command by the ITR;
   after assigning the second one of the plurality of low-demand system resources to the second command, assigning the token corresponding to the second system resource to the second command by the ITR; and receiving from the ITR a second request for the token corresponding to the second system resource for the second command in response to receiving the second command, wherein receiving the second request for the token corresponding to the second system resource for the second command includes receiving the second request for the token corresponding to the second system resource for the second command after the second system resource is assigned to the second command.

10. The method of claim 9 further comprising assigning the second system resource to the first command.

11. The method of claim 9 wherein:

assigning the first one of the plurality of low-demand system resources to the first command includes assigning a token corresponding to the first one of the plurality of low-demand system resources to the first command; and assigning the second one of the plurality of low-demand system resources to the second command includes assigning a token corresponding to the second one of the plurality of low-demand system resources to the second command.

12. The method of claim 9 wherein:

the plurality of low-demand system resources includes memory; and the second system resource includes bus bandwidth.

13. An apparatus for managing system resource allocation, comprising:

a plurality of logic hardware circuits adapted to:

receive at an input/output controller (IOC) a first command that requires a system resource;

receive from an IOC token requestor (ITR) a first request for a token corresponding to the system resource for the first command in response to receiving the first command;

receive at the IOC a second command that requires the system resource;

assign the token corresponding to the system resource to the second command by the ITR; and receive from the ITR a second request for a token corresponding to the system resource for the second command in response to receiving the second command, wherein the plurality of logic hardware circuits includes a token manager adapted to receive the first request for the token corresponding to the system resource for the first command, and receive the second request for the token corresponding to the system resource for the second command, and wherein the token manager is further adapted to receive the second request for the token corresponding to the system resource for the second command after the token corresponding to the system resource is assigned to the second command.

14. The apparatus of claim 13 wherein the plurality of logic hardware circuits includes the input/output controller (IOC).

15. The apparatus of claim 13 wherein the plurality of logic hardware circuits includes the IOC token requester.

16. The apparatus of claim 15 wherein the IOC includes the IOC token requester.

17. An apparatus for managing system resource allocation, comprising:

a plurality of logic hardware circuits adapted to:

receive at an input/output controller (IOC) a first command that requires a first system resource, wherein the first command is of a first priority;

receive from an IOC token requestor (ITR) a first request for a token corresponding to the first system resource for the first command in response to receiving the first command;

receive at the IOC a second command that requires the first system resource, wherein the second command is of the first priority;

assign the token corresponding to the first system resource to the second command by the ITR; and receive from the ITR a second request for the token corresponding to the first system resource for the second command in response to receiving the second command, wherein the plurality of logic hardware circuits includes a token manager adapted to receive the first request for the token corresponding to the first system resource for the first command, and receive the second request for the token corresponding to the first system resource for the second command, and wherein the token manager is further adapted to receive the second request for the token corresponding to the first system resource for the second command after the token corresponding to the first system resource is assigned to the second command.

18. The apparatus of claim 17 wherein the plurality of logic hardware circuits includes the input/output controller (IOC).

19. The apparatus of claim 18 wherein the IOC is further adapted to receive a third command that requires at least one of the first system resource or a second system resource, wherein the third command is of a second priority.

20. The apparatus of claim 19 wherein the plurality of logic hardware circuits are further adapted to:

receive a request for the required system resource for the third command; and assign the required system resource to the third command based on the second priority.

21. The apparatus of claim 17 wherein the plurality of logic hardware circuits includes the IOC token requester.

22. The apparatus of claim 21 wherein the IOC includes the IOC token requester.

23. An apparatus for managing system resource allocation, comprising:

a plurality of logic hardware circuits adapted to:

receive at an input/output controller (IOC) a first command that requires a first one of a plurality of low-demand system resources and a second system resource, wherein the demand for the second system resource is high;

assign the first one of the plurality of low-demand system resources to the first command by an IOC token requestor (ITR);

after assigning the first one of the plurality of low-demand system resources to the first command, receive from the ITR a first request for a token corresponding to the second system resource for the first command in response to receiving the first command;

receive at the IOC a second command that requires a second one of the plurality of low-demand system resources and the second system resource;

assign the second one of the plurality of low-demand system resources to the second command by the ITR;

after assigning the second one of the plurality of low-demand system resources to the second command, assign the token corresponding to the second system resource to the second command by the ITR; and receive from the ITR a second request for the token corresponding to the second system resource for the second command in response to receiving the second command, wherein the plurality of logic hardware circuits includes a token manager adapted to receive the first request for the token corresponding to the second system resource for the first command, and receive the second request for the token corresponding to the second system resource for the second command, and wherein the token manager is further adapted to receive the second request for the token corresponding to the second system resource for the second command after the second system resource is assigned to the second command.

24. The apparatus of claim 23 wherein the plurality of logic hardware circuits are further adapted to:

assign a token corresponding to the first one of the plurality of low-demand system resources to the first command; and assign a token corresponding to the second one of the plurality of low-demand system resources to the second command.

25. The apparatus of claim 23 wherein the plurality of logic hardware circuits includes the input/output controller (IOC).

26. The apparatus of claim 23 wherein the plurality of logic hardware circuits includes the IOC token requester.

27. The apparatus of claim 26 wherein the IOC includes the IOC token requester.

28. The apparatus of claim 23 wherein:

the plurality of low-demand system resources includes memory; and the second system resource includes bus bandwidth.

* * * * *